(12) United States Patent
Michallon et al.

(10) Patent No.: US 11,928,888 B2
(45) Date of Patent: Mar. 12, 2024

(54) IMAGE ACQUISITION DEVICE

(71) Applicant: ISORG, Limoges (FR)

(72) Inventors: Jérôme Michallon, Grenoble (FR); Delphine Descloux, Grenoble (FR); Benjamin Bouthinon, Grenoble (FR)

(73) Assignee: ISORG, Limoges (FR)

( * ) Notice: Subject to any disclaimer, the term of this patent is extended or adjusted under 35 U.S.C. 154(b) by 0 days.

(21) Appl. No.: 18/021,540

(22) PCT Filed: Aug. 12, 2021

(86) PCT No.: PCT/EP2021/072470
§ 371 (c)(1),
(2) Date: Feb. 15, 2023

(87) PCT Pub. No.: WO2022/038034
PCT Pub. Date: Feb. 24, 2022

(65) Prior Publication Data
US 2023/0306779 A1    Sep. 28, 2023

(30) Foreign Application Priority Data
Aug. 17, 2020 (FR) ...................... 20/08532

(51) Int. Cl.
*G06V 40/12* (2022.01)
*G02B 5/20* (2006.01)
(Continued)

(52) U.S. Cl.
CPC ........... *G06V 40/1388* (2022.01); *G02B 5/20* (2013.01); *G06V 10/143* (2022.01);
(Continued)

(58) Field of Classification Search
CPC ............. G06V 40/1388; G06V 10/143; G06V 40/1365; G06V 40/45; G02B 5/20; H04N 23/11
See application file for complete search history.

(56) References Cited

U.S. PATENT DOCUMENTS 9,559,239 B2   1/2017  Yamamoto
9,570,002 B2   2/2017  Sakariya et al.
(Continued)

FOREIGN PATENT DOCUMENTS

EP    2657929 A2     10/2013
EP    3593342 A1 *   1/2020 ........... G06F 3/0412
(Continued)

OTHER PUBLICATIONS

Authorized Officer: Martinez, Francis, International Search Report issued in related PCT application No. PCT/EP2021/072465, dated Nov. 16, 2021, 3 pp.
(Continued)

*Primary Examiner* — Jonathan A Boyd
(74) *Attorney, Agent, or Firm* — Kaplan Breyer Schwarz, LLP

(57) ABSTRACT

An image acquisition device includes a single sensor having organic photodetectors, an angular filter, and a color filter. The color filter has one or a plurality of first portions adapted to give way to at least one wavelength in the visible range, and one or a plurality of second portions filtering wavelengths outside of red and/or near infrared. The second portion has a surface area approximately equal to a surface area of one of the photodetectors or a surface area greater than or equal to the surface area of four of the photodetectors.

14 Claims, 9 Drawing Sheets

(51) Int. Cl.
*G06V 10/143* (2022.01)
*G06V 40/40* (2022.01)
*H04N 23/11* (2023.01)

(52) U.S. Cl.
CPC .......... *G06V 40/1365* (2022.01); *G06V 40/45* (2022.01); *H04N 23/11* (2023.01)

(56) References Cited

U.S. PATENT DOCUMENTS

| | | | |
|---|---|---|---|
| 9,904,839 | B2 | 2/2018 | Sun et al. |
| 10,535,721 | B2 | 1/2020 | Puszka et al. |
| 10,782,809 | B2 | 9/2020 | Schwartz et al. |
| 2003/0179323 | A1 | 9/2003 | Abileah et al. |
| 2008/0007542 | A1 | 1/2008 | Eliasson et al. |
| 2009/0185722 | A1 | 7/2009 | Kajihara et al. |
| 2010/0264297 | A1 | 10/2010 | Kurahashi |
| 2011/0042766 | A1 | 2/2011 | Kurokawa et al. |
| 2013/0033601 | A1 | 2/2013 | Kim et al. |
| 2013/0127790 | A1 | 5/2013 | Wassvik |
| 2014/0198957 | A1 | 7/2014 | Aoki et al. |
| 2015/0055057 | A1 | 2/2015 | Huang |
| 2015/0187980 | A1 | 7/2015 | Yamamoto |
| 2015/0293661 | A1 | 10/2015 | Gomez |
| 2015/0331508 | A1 | 11/2015 | Nho et al. |
| 2015/0333285 | A1 | 11/2015 | Ogasawara |
| 2016/0328595 | A1 | 11/2016 | Sun et al. |
| 2017/0062643 | A1 | 3/2017 | Segura-Puchades |
| 2017/0337413 | A1 | 11/2017 | Bhat et al. |
| 2019/0051709 | A1* | 2/2019 | Puszka .................. H10K 59/60 |
| 2019/0125221 | A1 | 5/2019 | Kobayashi et al. |
| 2020/0119109 | A1 | 4/2020 | Puszka et al. |
| 2020/0380282 | A1* | 12/2020 | Schwartz ............... H10K 59/40 |
| 2021/0073507 | A1* | 3/2021 | Kim ....................... H10K 59/65 |

FOREIGN PATENT DOCUMENTS

| | | | |
|---|---|---|---|
| EP | 3593342 A1 | 1/2020 | |
| FR | 2996933 A1 | 4/2014 | |
| FR | 3040577 A1 | 3/2017 | |
| WO | 2017/024850 A1 | 2/2017 | |
| WO | 2017/095858 A1 | 6/2017 | |
| WO | 2017/214582 A1 | 12/2017 | |
| WO | WO-2017214582 A1 * | 12/2017 | ........... A61B 5/1172 |

OTHER PUBLICATIONS

Authorized Officer: Thibault, Guillaume, International Search Report issued in PCT application No. PCT/EP2021/072470, dated Nov. 4, 2021, 2 pp.
Authorized Officer: Agnes Wittmann-Regis, English Translation of the Written Opinion of the International Search Authority issued in PCT application No. PCT/EP2021/072470, dated Nov. 4, 2021, 7 pp.
Authorized Officer: Agnes Wittmann-Regis, English Translation of the Written Opinion of the International Searching Authority issued in PCT application No. PCT/EP2021/072465, dated Nov. 16, 2021, 6 pp.
Authorized Officer: Lauri, Laura, International Search Report issued in PCT application No. PCT/FR2018/050516, dated Jun. 4, 2018, 3 pp.
Benjamin Bouthinon et al., Unpublished Related U.S. Appl. No. 18/021,536 entitled System for Acquiring Images, filed Feb. 15, 2023.
Examiner Interview Summary Record (PTOL-413) dated Feb. 17, 2021 for U.S. Appl. No. 16/491,830.
Search Report issued in French patent application No. 17/57669, dated Feb. 14, 2018, 3 pp.
Search Report issued in French patent application No. 17/57670, dated Apr. 6, 2018.
Search Report issued in French patent application No. 17/51789, dated Aug. 7, 2017 2 pp.
Non-Final Rejection dated Aug. 6, 2020 for U.S. Appl. No. 16/706,026.
Non-Final Rejection dated Jan. 27, 2021 for U.S. Appl. No. 16/706,026.
Non-Final Rejection dated Oct. 28, 2020 for U.S. Appl. No. 16/491,830.
Non-Final Rejection received for U.S. Appl. No. 16/058,776, dated May 13, 2019, 7 pages.
Notice of Allowance and Fees Due (PTOL-85) dated Feb. 17, 2021 for U.S. Appl. No. 16/491,830.
Notice of Allowance and Fees Due (PTOL-85) dated May 28, 2021 for U.S. Appl. No. 16/706,026.
Notice of Allowance received for U.S. Appl. No. 16/058,776, dated Sep. 5, 2019, 7 pages.
Written Opinion of the International Searching Authority issued in PCT application No. PCT/FR2018/050516, dated Jun. 4, 2018, 5 pp.

* cited by examiner

IMAGE ACQUISITION DEVICE

RELATED APPLICATIONS

The present application claims the priority benefit of French patent application number 2008532 filed on Aug. 17, 2020 and entitled "dispositif d'acquisition d'images", the content of which is incorporated herein by reference as authorized by law.

FIELD

The present disclosure generally concerns image acquisition devices and more particularly, fingerprint acquisition devices.

BACKGROUND

Fingerprint acquisition devices are used in many fields in order to, for example, secure appliances, secure buildings, control accesses, or control the identity of individuals.

While data, information, and accesses protected by fingerprint sensors multiply, fingerprint acquisition devices are the target of significant fraud.

The most current types of fraud are photocopies of fingers or of fingerprints or the reconstitution of fingers or of fingerprints in silicone, in latex, etc.

SUMMARY

There is a need to improve and to secure fingerprint acquisition devices.

An embodiment overcomes all or part of the disadvantages of known fingerprint acquisition devices.

An embodiment provides an image acquisition device comprising:
a single sensor comprising organic photodetectors, an angular filter, and
a color filter comprising:
  one or a plurality of first portions adapted to giving way to at least one wavelength in the visible range, and
  one or a plurality of second portions filtering wavelengths outside of red and/or near infrared, each second portion having a surface area approximately equal to the surface area of a photodetector or a surface area greater than or equal to the surface area of four photodetectors; or
an image processing unit adapted to extracting information relative to fingerprints and to veins of a hand imaged by the sensor and a waveguide layer illuminated in the plane by:
  a first source emitting at least one wavelength in the visible range, and
  a second source only emitting one or a plurality of wavelengths in red and/or near infrared.

According to an embodiment:
the first source only emits in the waveband from 400 nm to 600 nm; and/or
the second source only emits in the waveband from 600 nm to 1,100 nm.

According to an embodiment:
the first source only emits in the band from 460 nm to 600 nm; and/or
the second source only emits in the band from 680 nm to 940 nm.

According to an embodiment, the first source faces the second source.

An embodiment provides an image acquisition device comprising a single sensor comprising organic photodetectors, an angular filter, and a color filter, different from the angular filter, comprising:
one or a plurality of first portions adapted to giving way to at least one wavelength in the visible range, and
one or a plurality of second portions filtering wavelengths outside of red and/or near infrared, each second portion having a surface area approximately equal to the surface area of a photodetector or a surface area greater than or equal to the surface area of four photodetectors.

According to an embodiment:
the first portions of the color filter are adapted to giving way to at least one wavelength in the band from 400 nm to 600 nm, and/or
the second portions of the color filter filter wavelengths outside of the band from 600 nm to 1,100 nm.

According to an embodiment:
some of the first portions of the color filter are adapted to only giving way to wavelengths in the band from 460 nm to 600 nm, and some of the first portions are adapted to only giving way to wavelengths in the band from 500 nm to 580 nm; and/or
some of the second portions of the color filter are adapted to filtering wavelengths outside of the band from 600 nm to 700 nm, and some of the second portions are adapted to filtering wavelengths outside of the band from 700 nm to 1,100 nm.

According to an embodiment:
all first portions and second portions of the color filter are adapted to giving way at least to wavelengths in the band from 700 nm to 1,100 nm;
some of the first portions or second portions of the color filter are adapted to in addition only giving way to wavelengths in the band from 400 nm to 500 nm;
some of the first portions or second portions of the color filter are adapted to in addition only giving way to wavelengths in the band from 500 nm to 600 nm;
some of the first portions or second portions of the color filter are adapted to in addition only giving way to wavelengths in the band from 600 nm to 700 nm;
some of the first portions or second portions of the color filter are adapted to filtering wavelengths outside the band from 700 nm to 1,100 nm.

According to an embodiment, each photodetector delimits a pixel, each pixel having a substantially square base, the length of the sides of each pixel being preferably in the order of 50 μm.

According to an embodiment, each second portion has a surface area in the range from the surface area of four photodetectors to the surface area of six photodetectors, preferably, the surface area of each second portion being approximately equal to the surface area of four photodetectors.

According to an embodiment, the device comprises a third light source, or a light source, adapted to emitting:
at least one wavelength between 400 nm and 600 nm, preferably between 460 nm and 600 nm; and
at least one wavelength between 600 nm and 1,100 nm, preferably between 680 nm and 940 nm.

According to an embodiment, the device comprises, in the order:
the image sensor;
the angular filter;
the third light source or the light source; and
the color filter.

According to an embodiment, the device comprises, in the order:
the image sensor;
the angular filter;
the color filter; and
the third light source or the light source.

According to an embodiment, the device comprises, in the order:
the image sensor;
the color filter;
the angular filter; and
the third light source or the light source.

According to an embodiment, a support is present in contact with the color filter, the support being made of a polymer clear in the visible range and in infrared, preferably made of PET.

Another embodiment provides a method of detection of a real or fake finger, by the previously-described image acquisition device, comprising the steps of:
acquiring an image of the finger at a given wavelength;
determining a response signal from said image; and
comparing the determined response signal with a reference value according to a comparison criterion and determining that the finger is a fake finger if the comparison criterion is not respected,
wherein steps a), b), and c) are repeated for at least two different wavelengths.

According to an embodiment, step b) comprises determining a grey level distribution of the acquired image, the response signal being equal to the central grey level of the distribution.

According to an embodiment, the comparison criterion comprises determining whether the determined response signal corresponds to the reference value, to within a threshold.

According to an embodiment, the threshold corresponds to the difference between the reference value and a grey level value at half-maximum of a reference distribution.

According to an embodiment, steps a), b), and c) are repeated for at least three different wavelengths.

BRIEF DESCRIPTION OF THE DRAWINGS

The foregoing features and advantages, as well as others, will be described in detail in the following description of specific embodiments given by way of illustration and not limitation with reference to the accompanying drawings, in which.

DESCRIPTION OF THE EMBODIMENTS

Figure 1:
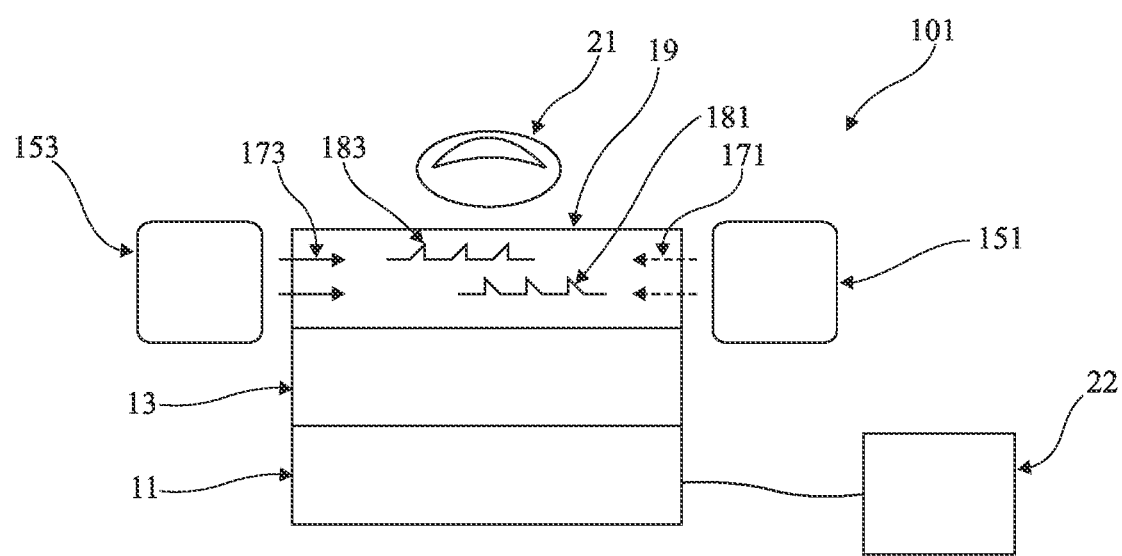
FIG. 1 illustrates, in a partial simplified cross-section view, an embodiment of an image acquisition device.

Like features have been designated by like references in the various figures. In particular, the structural and/or functional features that are common among the various embodiments may have the same references and may dispose identical structural, dimensional and material properties.

For the sake of clarity, only the steps and elements that are useful for an understanding of the embodiments described herein have been illustrated and described in detail. In particular, the forming of the image sensor has not been detailed, the described embodiments and implementation modes being compatible with the usual forming of a sensor, of a filter, and of possible other elements of the sensor.

Unless indicated otherwise, when reference is made to two elements connected together, this signifies a direct connection without any intermediate elements other than conductors, and when reference is made to two elements coupled together, this signifies that these two elements can be connected or they can be coupled via one or more other elements.

In the following disclosure, unless otherwise specified, when reference is made to absolute positional qualifiers, such as the terms "front", "back", "top", "bottom", "left", "right", etc., or to relative positional qualifiers, such as the terms "above", "below", "upper", "lower", etc., or to qualifiers of orientation, such as "horizontal", "vertical", etc., reference is made to the orientation shown in the figures.

Unless specified otherwise, the expressions "around", "approximately", "substantially" and "in the order of" signify within 10%, and preferably within 5%.

In the following description, unless specified otherwise, a layer or a film is called opaque to a radiation when the transmittance of the radiation through the layer or the film is smaller than 10%. In the following description, a layer or a film is called transparent to a radiation when the transmittance of the radiation through the layer or the film is greater than 10%. According to an embodiment, for a same optical system, all the elements of the optical system which are opaque to a radiation have a transmittance which is smaller than half, preferably smaller than one fifth, more preferably smaller than one tenth, of the lowest transmittance of the elements of the optical system transparent to said radiation. In the rest of the disclosure, the expression "useful radiation" designates the electromagnetic radiation crossing the optical system in operation. In the following description, "micrometer-range optical element" designates an optical element formed on a surface of a support having a maximum dimension, measured parallel to said surface, greater than 1 µm and smaller than 1 mm. Wavelength of a radiation, or central or main wavelength of the radiation, designates the wavelength at which the maximum of the spectrum of the radiation is reached.

Embodiments of optical systems will now be described for optical systems comprising an array of micrometer-range optical elements in the case where each micrometer-range optical element corresponds to a micrometer-range lens, or microlens, formed of two dioptres. It should however be clear that these embodiments may also be implemented with other types of micrometer-range optical elements, where each micrometer-range optical element may for example correspond to a micrometer-range Fresnel lens, to a micrometer-range index gradient lens, or to a micrometer-range diffraction grating.

In the following description, visible light designates an electromagnetic radiation having a wavelength in the range from 400 nm to 700 nm and, in this range, red light designates an electromagnetic radiation having a wavelength in the range from 600 nm to 700 nm. Call infrared radiation an electromagnetic radiation having a wavelength in the range from 700 nm to 1 mm. In the infrared radiation, one can in particular distinguish near infrared radiation having a wavelength in the range from 700 nm to 1.1 µm.

Unless specified otherwise, the expressions "all the elements", "each element", signify between 95% and 100% of the elements.

Unless specified otherwise, the expression "it only comprises the elements" signifies that it comprises, by at least 90%, the elements, preferably that it comprises, by at least 95%, the elements.

FIG. 1 illustrates, in a partial simplified cross-section view, an embodiment of an image acquisition device 101.

According to the embodiment illustrated in FIG. 1, image acquisition device 101 comprises, from bottom to top in the orientation of the drawing:
a single organic image sensor 11;
an optical filter 13, preferably, an angular filter; and
a layer 19 called waveguide located vertically in line with optical filter 13.

Device 101 comprises a first light source 151 emitting at least one wavelength in the visible range and a second light source 153 emitting at least one wavelength in red and/or near infrared.

The two sources 151 and 153 preferably face each other. Sources 151 and 153 are laterally coupled to layer 19 and are not located vertically in line with the stack of sensor 11, of optical filter 13, and of layer 19.

According to the embodiment illustrated in FIG. 1, first source 151 is adapted to emitting a first radiation, or green radiation, 171 comprising at least one wavelength in the band from 400 nm to 600 nm. Preferably, the first radiation 171 only comprises first electromagnetic waves having their wavelengths in the band from 400 nm to 600 nm, preferably in the band from 460 nm to 600 nm. More preferably, the first radiation 171 only comprises first electromagnetic waves having wavelengths equal to approximately 530 nm (green) or 500 nm (cyan).

The second source 153 is adapted to emitting a second radiation, or red radiation, 173 only comprising second electromagnetic waves having wavelengths in the band from 600 nm to 1,700 nm, preferably in the band from 680 nm to 940 nm. The second electromagnetic waves may be monochromatic or polychromatic.

According to the embodiment illustrated in FIG. 1, device 101 captures the image response of an object 21, partially shown, preferably a finger.

According to an embodiment, device 101 comprises a processing unit 22 comprising, for example, a microprocessor (not shown). Processing unit 22 is for example a computer or a cell phone (smartphone).

Sensor 11 comprises photodetectors (not shown), preferably, arranged in array form. The photodetectors preferably all have the same structure and the same properties/characteristics. In other words, all photodetectors are substantially identical, to within manufacturing differences. Sensor 11 is preferably adapted to capturing radiations 171 and 173.

Layer 19 called waveguide layer comprises a structure of two or three mediums having different refraction indexes (not shown in FIG. 1).

As an example, layer 19 comprises sub-layers enabling to increase the hardness of the final layer 19 but which may not be implied in the wave propagation.

For the needs of the present description, the refraction index of a medium is defined as being the refraction index of the material forming the medium for the wavelength range of the radiation captured by the image sensor. The refraction index is considered as substantially constant over the wavelength range of the useful radiation, for example, equal to the average of the refraction index over the wavelength range of the radiation captured by the image sensor.

A waveguide layer is structurally adapted to allowing the confinement and the propagation of electromagnetic waves. The mediums are for example arranged in the form of a stack of three sub-layers, a central layer sandwiched between an upper sheath and a lower sheath, the refraction indexes of the materials forming the sheaths being smaller than the refraction index of the material forming the central layer, the lower sheath being located on the side of optical filter 13. Preferably, microstructures are formed between the central layer and the lower sheath. The microstructures preferably have shapes of prisms or of teeth having their tip oriented towards the object to be imaged and having their bases flush with the rear surface of the central layer. Each microstructure has a surface slightly inclined in the wave propagation direction so that the propagated wave is deviated and follows the geometry of the microstructure. The inclination of the surface of the microstructure is for example in the range from 5° to 80°. The inclination is preferably in the order of 45°. For example, the microstructures are not uniformly distributed along the wave path. The microstructure density is preferably higher and higher as the distance to the source of the radiation deviated by these microstructures increases.

A first array of microstructures 181 is for example adapted to guiding the first waves of the first radiation 171 emitted by first source 151. The first array then comprises microstructures 181 inclined in the direction of the waves emitted by first source 151.

A second array of microstructures 183 is for example adapted to guiding the second waves of the second radiation 173 emitted by second source 153. The second array then comprises microstructures 183 inclined in the direction of the waves emitted by second source 153.

Preferably, the first array of microstructures 181 extends from the lateral edge of layer 19, adjacent to source 151 all the way to, at most, the lateral edge, opposite to source 151, of layer 19.

Preferably, the second array of microstructures 183 extends from the lateral edge of layer 19 adjacent to source 153, all the way to, at most, the lateral edge of layer 19 opposite to source 153.

According to an embodiment, not shown, layer 19 comprises a single array of microstructures, where the geometry of the microstructures is adapted to guiding the first waves of the first radiation 171 originating from the first source 151 and the second waves of the second radiation 173 originating from the second source 153.

According to an embodiment, not shown, device 101 comprises two stacked waveguide layers, one of which covers the upper surface of optical filter 13, the first waveguide layer receiving the first radiation emitted by first source 151, and the second waveguide layer receiving the second radiation emitted by second source 153. The first waveguide layer then comprises the first array of microstructures 181 and the second waveguide layer comprises the second array of microstructures 183.

According to an embodiment, sources 151 and 153 face each other. Preferably, sources 151 and 153 are positioned on the periphery of layer 19. For example, in the orientation of FIG. 1, source 151 is located on the left-hand side of layer 19, and source 153 is located on the right-hand side of layer 19.

According to a variant, not shown, sources 151 and 153 are located indifferently with respect to each other. The two sources 151 and 153 are positioned, for example, on the same side of layer 19, one behind the other, one next to the other, or so that radiations 171 and 173 are orthogonal.

According to an embodiment, sources 151 and 153 are turned on one after the other to successively image finger 21 with first radiation 171 only, and then finger 21 with second radiation 173 only.

The inventors have shown that it is possible to tell a real finger from a fake finger based on images acquired of the finger by an image acquisition device, particularly, the image acquisition device such as previously described, the finger being illuminated by at least two radiations at different wavelengths. For each acquired image, a signal, called finger response, may be determined from the values of the pixels of the acquired image. According to an embodiment, the response is equal to the average, possibly weighted, of the values of the pixels of the acquired image. Reference values of responses for a real finger may be stored for different wavelengths. The detection of a fake finger may be performed by comparing the response of the tested finger with the reference response for at least two different wavelengths. If the response of the tested finger differs from the reference response for at least one wavelength, the tested finger is considered as being a fake finger.

According to an embodiment, device 101 comprises more than two light sources, emitting identical or different radiations in visible wavelengths. Device 101 then comprises a number of waveguide layers smaller than or equal to the number of sources, each of the waveguide layers comprising at least one array of microstructures.

Figure 2:
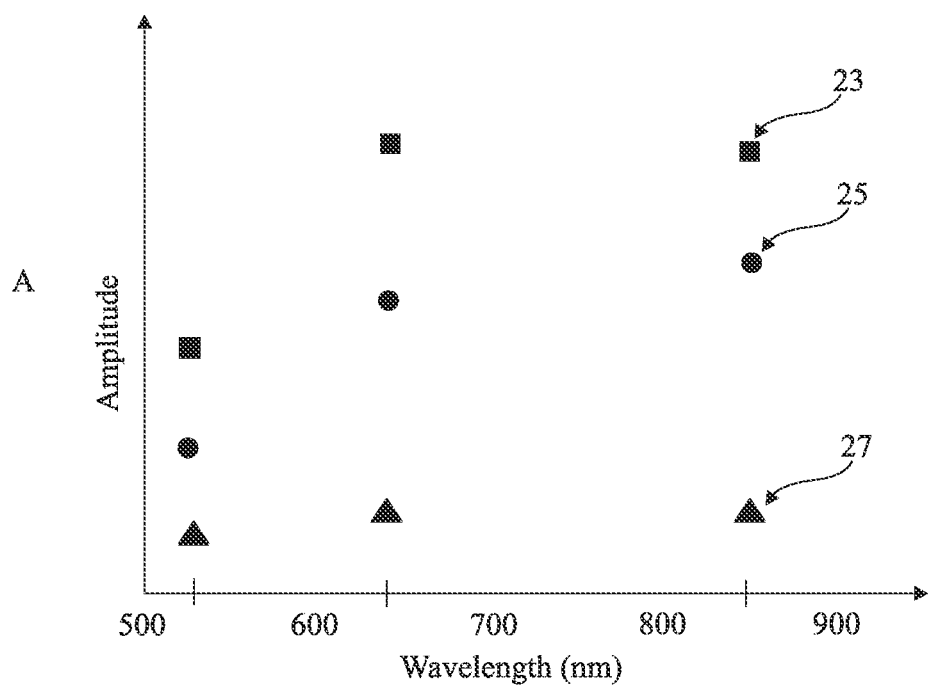
FIG. 2 shows examples of responses of real and fake fingers, illuminated by a radiation, determined from images acquired by an image acquisition device.
Figure 2:
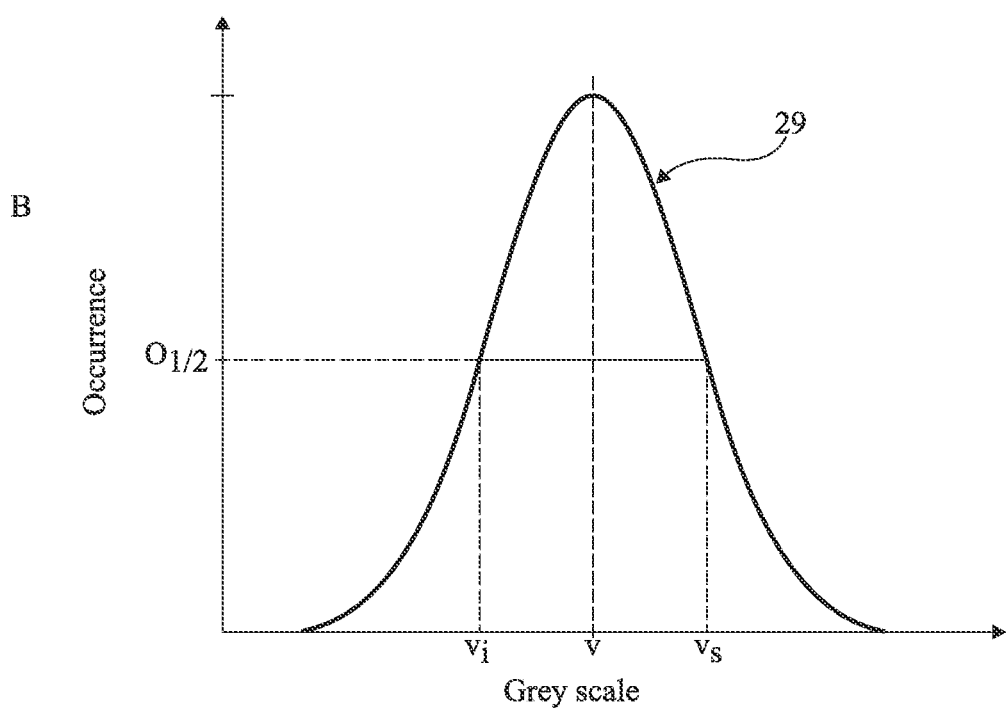

FIG. 2 shows examples of responses of real and fake fingers, illuminated by a radiation, determined from images acquired by an image acquisition device.

More particularly, FIG. 2 comprises a first graph in a view A illustrating the variation of the response of fingers (Amplitude) according to the wavelength (Wavelength (nm)) of the radiation which illuminates them and to the nature of the fingers.

In FIG. 2, the response of a finger to a given wavelength corresponds to the "average" of the values of the pixels of the acquired image of the finger illuminated by a radiation at said wavelength.

The inventors have observed that responses for a fake finger, under a radiation having a given wavelength, are clearly different from responses for a real finger, under the same radiation, and this, whatever the considered wavelength. In view A of FIG. 2, the responses of a real finger for three wavelengths are indicated by square marks 23, the responses of a three-dimensional fake finger (for example, a silicone finger) are indicated by round marks 25, and the responses of a two-dimensional fake finger (for example, a photocopy of a finger) are indicated by triangular marks 27. Thus, the measurement of the response of any finger, at a given wavelength, enables to estimate whether this finger is a real finger or a fake finger.

In practice, the response, under a given wavelength, of a finger to be tested is compared with the reference response of a real finger. In other words, the finger to be tested is illuminated with a wavelength, after which one determines, based on the image of the finger to be tested acquired with the image acquisition device, the response of the finger, and compares this measured response with the reference response, at the same wavelength. Still in practice, the response of the finger to be tested is compared with the reference response at different wavelengths to gain reliability. If for one of the tested wavelengths, the measured response does not correspond to the reference response of a real finger according to a comparison criterion, for example if the difference, in absolute value, between the measured response and the reference response is greater than a threshold, the tested finger is considered as fake. As an example, the discussed comparison is performed at two different wavelengths, preferably, at least at three different wavelengths. Still as an example, the discussed comparison is performed under a radiation having a wavelength in the range from 460 nm to 600 nm, for example, in the order of 530 nm, under a radiation having a wavelength in the range from 600 nm to 700 nm, for example, in the order of 680 nm, and under a radiation having a wavelength in the range from 700 nm to 1,100 nm, for example, in the order of 850 nm.

According to an embodiment, the reference response to a given wavelength may be determined as follows: for an acquired image of a finger illuminated by a radiation at the given wavelength, the number of pixels having the same grey level value is counted, the distribution of the grey level values of the pixels provides a Gaussian curve. The Gaussian curve is centered on an "average" or central value which, calibrated by a value specific to the considered device, provides the reference response.

FIG. 2 comprises a graph in a view B illustrating, in a curve 29, an example of distribution (Occurrence) of the grey level values (grey scale) of the pixels of the images of a real finger at a wavelength in the order of 630 nm. Central value v for example corresponds to the reference response. The values at a half maximum $(O_{1/2})$ $v_s$ and $v_i$ of curve 29 define as an example the comparison threshold, which may be equal to $v-v_i$.

FIGS. 3 to 13 illustrate image acquisition devices capable of being used to detect the use of fake fingers as described in relation with FIG. 2.

FIGS. 3 to 13 further illustrate other embodiments of an image acquisition device comprising a single light source emitting a single radiation having its wavelengths locally filtered. The single radiation preferably comprises at the same time wavelengths in green, in red, and/or in infrared. The electromagnetic waves captured by photodetectors of the device are thus locally similar to the first electromagnetic waves or to the second electromagnetic waves.

Figure 3:
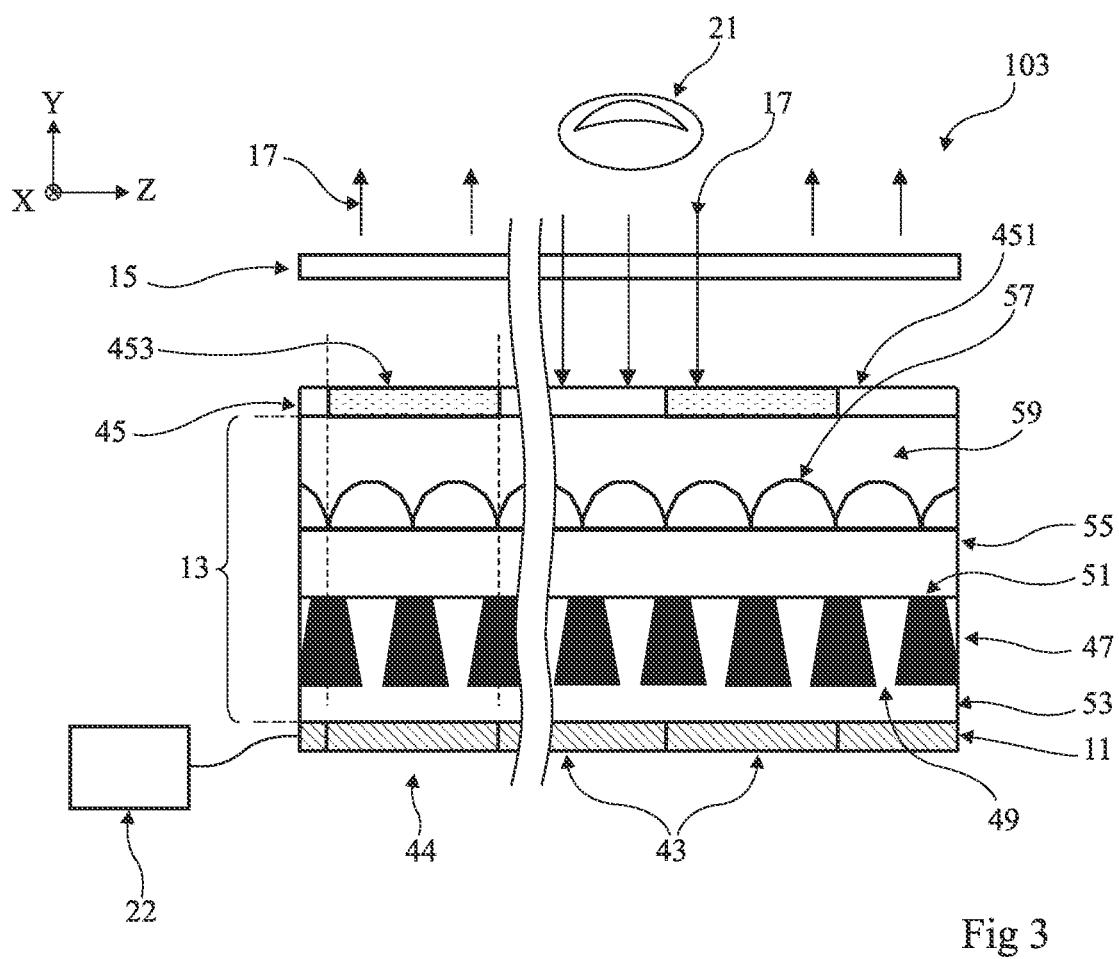
FIG. 3 illustrates, in a partial simplified cross-section view, another embodiment of an image acquisition device.

FIG. 3 illustrates, in a partial simplified cross-section view, another embodiment of an image acquisition device 103.

According to the embodiment illustrated in FIG. 3, image acquisition device 103 comprises:

an image sensor 11 comprising photodetectors or photodiodes 43; and an optical filter 13, preferably an angular filter.

In the present description, embodiments of the devices of FIGS. 3 to 13 are shown in space in a direct orthogonal frame XYZ, the axis Y of frame XYZ being orthogonal to the upper surface of sensor 11.

According to the embodiment illustrated in FIG. 3, device 103 captures the image response of an object 21, partially shown, preferably a finger.

According to an embodiment, device 103 comprises a processing unit 22 comprising, for example, a microprocessor (not shown). Processing unit 22 is for example a computer or a cell phone (smartphone).

Photodiodes 43 are for example organic photodiodes (OPD) integrated on a CMOS (Complementary Metal Oxide Semiconductor) substrate or a thin film transistor substrate (TFT). The substrate is for example made of silicon, preferably, of single-crystal silicon. The channel, source, and drain regions of the TFT transistors are for example made of amorphous silicon (a-Si), of indium gallium zinc oxide (IGZO), or of low temperature polysilicon (LIPS).

The photodiodes 43 of image sensor 11 comprise, for example, a mixture of organic semiconductor polymers, for example poly(3-hexylthiophene) or poly(3-hexylthiophene-2,5-diyl), known as P3HT, mixed with [6,6]-phenyl-C61-butyric acid methyl ester (N-type semiconductor), known as PCBM.

The photodiodes 43 of image sensor 11 for example comprise small molecules, that is, molecules having molar masses smaller than 500 g/mol, preferably, smaller than 200 g/mol.

Photodiodes 43 may be non-organic photodiodes, for example, formed based on amorphous silicon or crystalline silicon. As an example, photodiodes 43 are formed of quantum dots.

Photodetectors 43 are preferably arranged in array form. The repetition pitch of photodetectors 43 is, for example, in the range from 10 µm to 100 µm, preferably in the range from 32 µm to 80 µm. Photodetectors 43 preferably all have the same structure and the same properties/features. In other words, all photodetectors 43 are substantially identical, to within manufacturing differences. Sensor 11 is preferably adapted to detecting a radiation 17 emitted by a source 15.

Source 15 is adapted to emitting radiation 17 comprising:
at least one wavelength in the visible range, for example, in the band from 400 nm to 600 nm; and
at least one wavelength in red and/or near infrared, for example, in the range from 600 nm to 1,100 nm.

Preferably, radiation 17 comprises:
wavelengths in the band from 460 nm to 600 nm, for example, a wavelength equal to approximately 500 nm (cyan) or 530 nm (green); and
wavelengths in the band from 680 nm to 940 nm.

Light source 15 is formed, for example, of one of a plurality of light-emitting diodes (LED) associated with a waveguide layer. Light source 15 is formed, for example, of one or a plurality of organic light-emitting diodes (OLED). Preferably, source 15 is a LED associated with a waveguide layer.

Optical filter 13, illustrated in FIG. 3, comprises from bottom to top in the orientation of the drawing:
a first layer 47 comprising openings 49, or holes, and walls 51 opaque to radiation 17. Openings 49 are, for example, filled with a material forming, on the lower surface of layer 47, a layer 53;
a substrate or support 55, resting on the upper surface of layer 47; and
an array of micrometer-range lenses 57, located on the upper surface of substrate 55, the planar surface of lenses 57 and the upper surface of substrate 55 facing each other. The array of lenses 57 is topped with a planarizing layer 59.

Substrate 55 may be made of a clear polymer which does not absorb, at least, the considered wavelengths, here in the visible and infrared range. This polymer may in particular be made of polyethylene terephthalate PET, of poly(methyl methacrylate) PMMA, of cyclic olefin polymer (COP), of polyimide (PI), or of polycarbonate (PC). The thickness of substrate 55 may for example vary between 1 µm and 100 µm, preferably between 10 µm and 100 µm. Substrate 55 may correspond to a colored filter, to a polarizer, to a half-wave plate or to a quarter-wave plate.

Lenses 57 may be made of silica, of PMMA, of positive resist, of PET, of poly(ethylene naphthalate) (PEN), of COP, of polymethylsiloxane (PDMS)/silicone, of epoxy resin, or of acrylate resin. Lenses 57 may be formed by flowing of resist blocks. Lenses 57 may further be formed by molding on a layer of PET, PEN, COP, PDMS/silicone, of epoxy resin, or of acrylate resin. Lenses 57 are converging lenses, each having a focal distance f in the range from 1 µm to 100 µm, preferably from 1 µm to 70 µm. According to an embodiment, all lenses 57 are substantially identical. The lenses for example have a diameter in the range from 10 µm to 30 µm, preferably equal to approximately 20 µm. The repetition pitch of the lenses is preferably in the range from 10 µm to 30 µm, for example, equal to approximately 20 µm.

According to the present embodiment, lenses 57 and substrate 55 are preferably made of materials that are clear or partially clear, that is, clear in a portion of the spectrum considered for the targeted field, for example, imaging, over the wavelength range corresponding to the wavelengths used during the exposure.

According to an embodiment, layer 59 is a layer which follows the shape of lenses 57. Layer 59 may be obtained from an optically clear adhesive (OCA), particularly a liquid optically clear adhesive (LOCA), or a material with a low refraction index (for example, an epoxy/acrylate glue), or a film of a gas or of a gaseous mixture, for example, air.

Openings 49 are for example filled with air, with partial vacuum, or with a material at least partially clear in the visible and infrared ranges.

The described embodiments take as an example the case of an optical filter 13 forming an angular filter. However, these embodiments may apply to other types of optical filters, such as a spatial filter.

Angular filter 13 is adapted to filtering the incident radiation according to the incidence of the radiation with respect to the optical axes of lenses 57.

Angular filter 13, more particularly, adapted so that each photodetector 43 of image sensor 11 only receives the rays having their respective incidences with respect to the respective optical axes of the lenses 57 associated with this photodetector 43 smaller than a maximum incidence smaller than 45° preferably smaller than 30°, more preferably smaller than 10°, more preferably still smaller than 4°. Angular filter 13 is capable blocking the rays of the incident radiation having respective incidences relative to the optical axes of the lenses 57 of optical filter 13 greater than the maximum incidence.

Each opening 49 is preferably associated with a single lens 57. The optical axes of lenses 57 are preferably centered with the centers of the openings 49 of layer 47. The diameter of lenses 57 is preferably greater than the maximum size of the cross-section (perpendicular to the optical axis of lenses 57) of openings 49.

Each photodetector 43 for example associated with at least four openings 49 (and four lenses 57). Preferably, each photodetector 43 is associated with exactly four openings 49.

Device 103 is preferably divided into pixels. The term pixel is used all along the description to define a portion of image sensor 11 comprising a single photodetector 43. The denomination pixel may apply at the scale of image sensor 11, but also at the scale of structure 103. At the scale of structure 103, a pixel is the entire stack, forming said device, vertically in line with the pixel of sensor 11. All along this description, the term pixel, unless specified otherwise, refers to a pixel at the scale of device 103.

In the example of FIG. 3, a pixel 44 corresponds to each portion of structure 103 comprising, among others, a photodetector 43 topped with four openings 49, themselves topped with four lenses 57. Each pixel 44 is preferably of substantially square shape along a direction perpendicular to the upper surface of image sensor 11. For example, the surface area of each pixel is in the order of 50 μm by 50 μm, and is preferably equal to approximately 50.8 μm by 50.8 μm.

According to the embodiment illustrated in FIG. 3, device 103 comprises a color filter 45, on the front surface of optical filter 13, more particularly on the front surface of layer 59.

As a variant, color filter 45 is located between image sensor 11 and angular filter 13 or between two layers forming angular filter 13, for example, between layer 47 and substrate 55.

Color filter 45 is divided in two portions.

According to an embodiment, a first portion 451 is adapted to giving way to all wavelengths. As a variant, the first portion 451 is adapted to giving way to at least one wavelength in the band from 400 nm to 600 nm. Still as a variant, first portion 451 is adapted to only giving way to at least one wavelength in the band from 460 nm to 600 nm. According to a specific embodiment, first portion 451 is adapted to only giving way to the wavelength equal to 530 nm or the wavelength equal to 500 nm.

One or a plurality of second portions 453 are adapted to blocking all wavelengths outside of the band from 600 nm to 1,100 nm, preferably, outside of the band from 680 nm to 940 nm.

Figure 4:
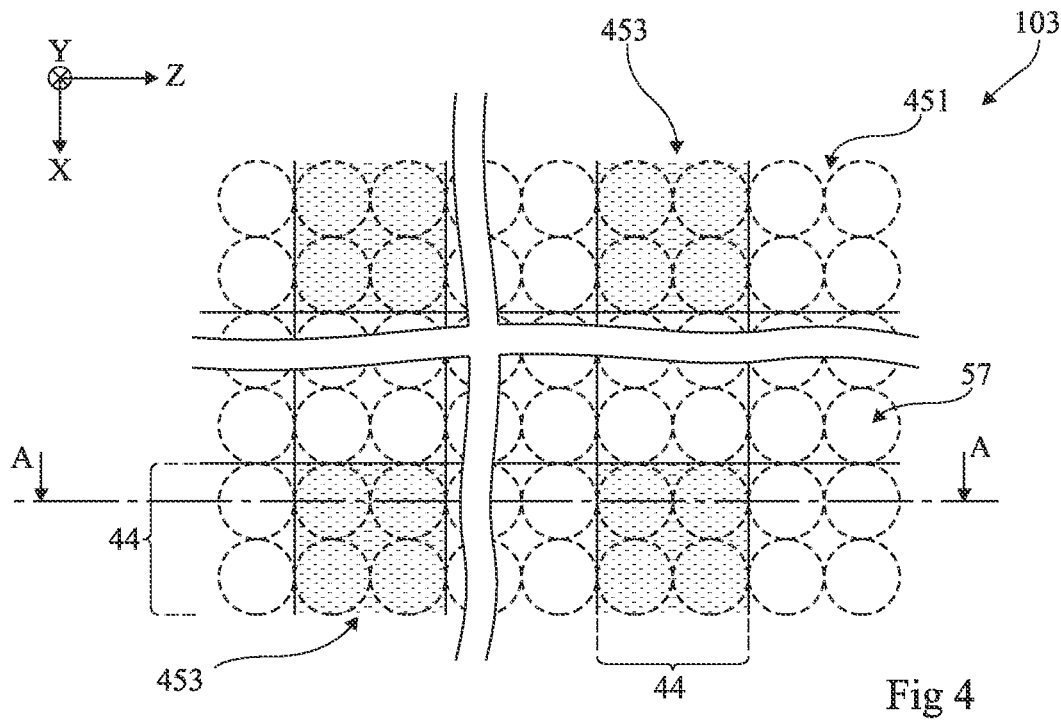
FIG. 4 shows, in a partial simplified top view, an embodiment of the device illustrated in FIG. 3.

FIG. 4 shows, in a partial simplified top view, an embodiment of the device 103 illustrated in FIG. 3.

More particularly, FIG. 4 is a top view of the device 103 illustrated in FIG. 3. FIG. 3 is a view along the cross-section plane AA of FIG. 4.

According to the embodiment illustrated in FIGS. 3 and 4, each second portion 453 of color filter 45 is formed at the surface of optical filter 13 so that each second portion 453 covers a single corresponding filter 44. Each second portion 453 is thus aligned with a photodetector 43.

According to the embodiment illustrated in FIGS. 3 and 4, each second portion 453 of color filter 45 has a square shape in the view of FIG. 4. For example, the surface area of each second portion 453 of color filter 45 is equal to a square of approximately 50.8 μm by 50.8 μm.

As an example, the repetition pitch of the second portions 453 of color filter 45 is between two pixels and twenty pixels. Preferably, the repetition pitch of the second portions 453 is in the range from five pixels to fifteen pixels. More preferably, the repetition pitch of the second portions 453 is approximately ten pixels along axis Z and ten pixels along axis X. In other words, nine pixels separate two consecutive pixels along axis Z (or X) covered with second portions 453. Still in other words, in a square assembly of one hundred pixels (that is, a square of ten pixels along axis Z and ten pixels along axis X), a single pixel is covered with a second portion 453. The distribution of the second portions 453 is aligned, that is, the repetition is performed in rows and in columns, or shifted, that is, the distribution is shifted by one or a plurality of pixels from one row to the next one or from one column to the next one.

According to the embodiment illustrated in FIG. 4, the other pixels 44 are covered with the first portion 451 of color filter 45. Preferably, first portion 451 is jointing between two neighboring pixels 44, that is, the first portion 451 is not pixelated and it is simultaneously formed over all the considered pixels of image sensor 11.

According to an implementation, the material forming first portion 451 is deposited, over the entire upper surface of optical filter 13, more particularly, on the upper surface of layer 59, and then removed by photolithography or photolithographic etching to form housings intended to receive second portions 453. Still as an example, the material forming second portions 453 is deposited full plate onto the upper surface of the structure and more precisely onto the upper surface of first portion 451 and into the housings. The upper surface of the layer of the material forming second portions 453 is then submitted to a chemical mechanical planarization (CMP) to expose the upper surface of first portion 451 or a photolithography to remove the second portions 453 located at the surface of first portion 451. According to an embodiment, the thickness of each second portion 453 is in the range from 200 nm to 10 μm, preferably from 500 nm to 2 μm.

As a variant, the first and second portions are locally deposited at the surface of angular filter 13 by local deposition techniques such as the silk screening technique, the inkjet technique, or the spray technique.

As a variant, the material forming second portions 453 is deposited according to one of the above-described techniques, preferably by photolithographic etching. Portions 451 then correspond to the spaces located between portions 453.

According to an embodiment, the material forming first portion 451 is air, a partial vacuum, or a material transparent in all wavelengths.

According to an embodiment, the material forming first portion 451 is a material only transparent to wavelengths in the range from 400 nm to 600 nm (visible filter), preferably in the range from 460 nm to 600 nm, for example, a resin comprising the dye known under trade name "Orgalon Green 520" or a resin from the commercial line "COLOR MOSAIC" of manufacturer Fujifilm.

According to an embodiment, the material forming first portion 451 is made of a material only transparent at 500 nm (cyan filter) or only transparent at 530 nm (green filter), for example, a resin comprising the dye known under trade name "PC GREEN 123P" or a resin from commercial series "COLOR MOSAIC" manufactured by Fujifilm.

Figure 5:
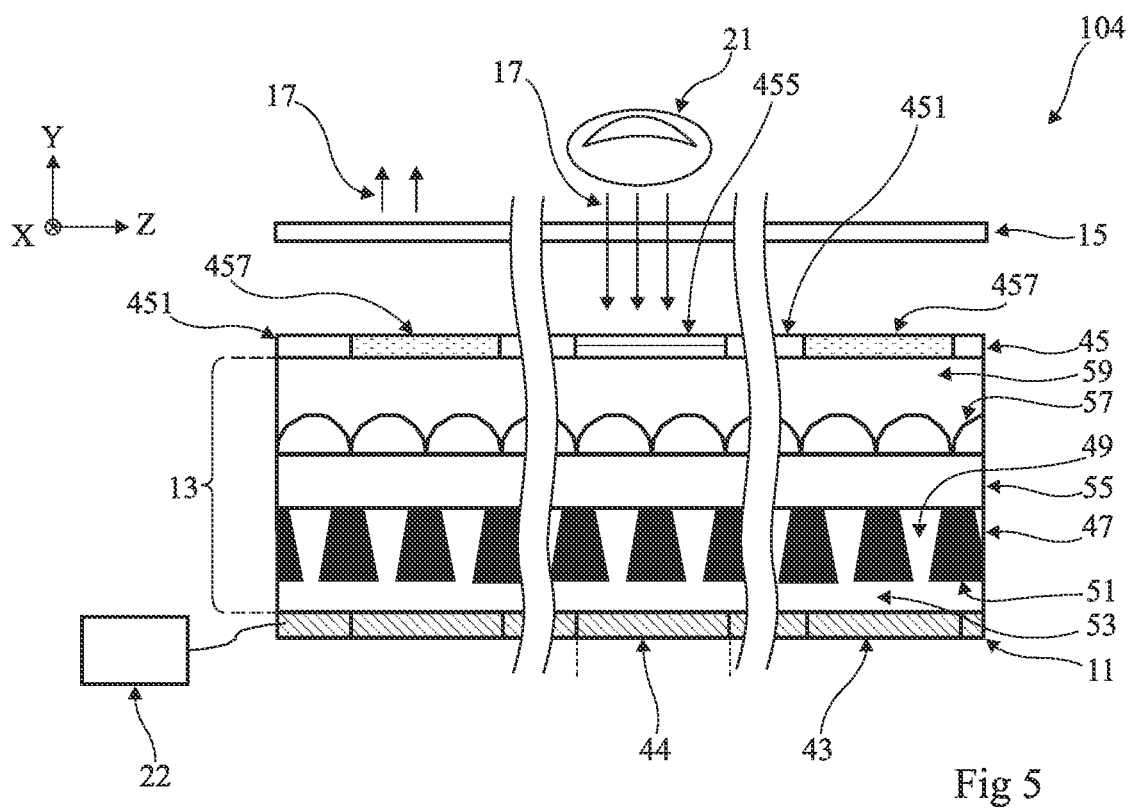
FIG. 5 illustrates, in a partial simplified cross-section view, another embodiment of an image acquisition device.
Figure 6:
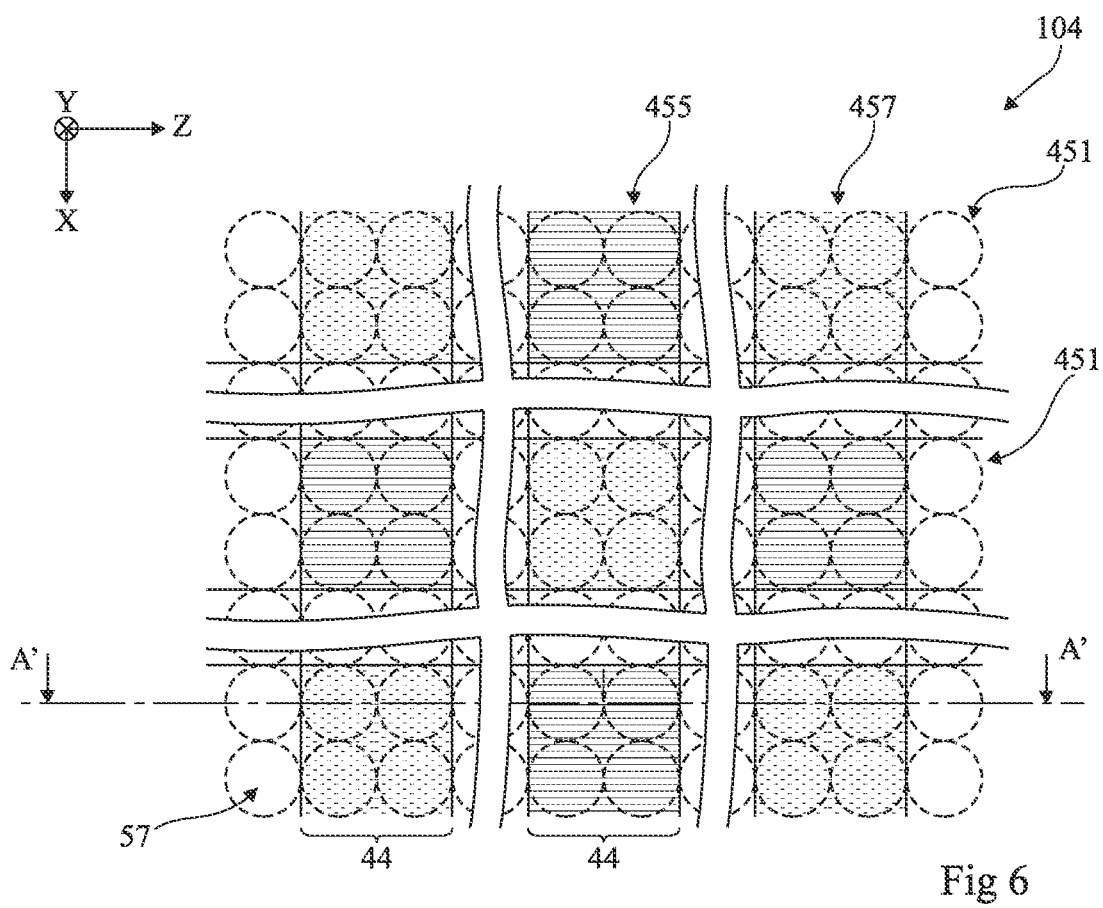
FIG. 6 shows, in a partial simplified top view, the device illustrated in FIG. 5.

FIGS. 5 and 6 illustrate, in a cross-section view and a top view, partial and simplified, another embodiment of an image acquisition device 104.

More particularly, FIGS. 5 and 6 illustrate a device 104 similar to the device 103 illustrated in FIGS. 3 and 4, with the difference that the second portions 453 of filter 45 illustrated in FIGS. 3 and 4 are now replaced with portions 455, now replaced with portions 457.

FIG. 6 is a top view of the device 104 illustrated in FIG. 5, FIG. 5 being a cross-section view along the cross-section plane A'A' of FIG. 6.

According to an embodiment, the portions 451 illustrated in FIGS. 5 and 6 are identical to the portions 451 illustrated in FIGS. 3 and 4.

Portion(s) 455 are for example adapted to blocking all wavelengths outside of the band from 600 nm to 700 nm, preferably outside of the band from 680 nm to 700 nm.

Portion(s) 457 are for example adapted to blocking all wavelengths outside of the band from 700 nm to 1,100 nm, preferably outside of the band from 680 nm to 940 nm.

The portions 455 and 457 illustrated in FIGS. 5 and 6 preferably have dimensions similar to the dimensions of the portions 453 illustrated in FIGS. 3 and 4. As an example, portions 455 and 457 are organized so that portions 455 and 457 alternate along axis Z and along axis X. In other words, two successive portions 455 are separated by a portion 457.

According to an embodiment, not shown, filter 45 comprises three portions filtering at different wavelengths. As an example, filter 45 comprises a portion, identical to the portion 453 illustrated in FIGS. 3 and 4, another portion adapted to blocking all wavelengths outside of the band from 460 nm to 600 nm, and still another portion adapted to blocking all wavelengths outside of the band from 500 nm to 580 nm.

As a variant, the number of portions is different from three. Filter 45 for example contains four portions, including a portion adapted to blocking all wavelengths outside of the band from 460 nm to 600 nm, another portion adapted to blocking all wavelengths outside of the band from 500 nm to 580 nm, another portion adapted to blocking all wavelengths outside of the band from 600 nm to 700 nm, and another portion adapted to blocking all wavelengths outside of the band from 700 nm to 1,100 nm.

According to another embodiment:
- all first portions and second portions of the color filter 45 are adapted to giving way at least to wavelengths in the band from 700 nm to 1,100 nm;
- some of the first portions or second portions of the color filter 45 are adapted to in addition only giving way to wavelengths in the band from 400 nm to 500 nm (typically the blue color);
- some of the first portions or second portions of the color filter 45, preferably the majority, are adapted to in addition only giving way to wavelengths in the band from 500 nm to 600 nm (typically the green color);
- some of the first portions or second portions of the color filter 45 are adapted to in addition only giving way to wavelengths in the band from 600 nm to 700 nm (typically the red color);
- some of the first portions or second portions of the color filter 45 are adapted to filtering wavelengths outside the band from 700 nm to 1,100 nm (typically the infrared).

Preferably, for embodiments different from the embodiments illustrated in FIGS. 3 to 6, the portions blocking wavelengths outside of the band from 600 nm to 1,100 nm are organized to replace the portions 453 of the image acquisition device 103 illustrated in FIGS. 3 and 4 and the other portions are organized to replace the portions 451 of the image acquisition device 103 illustrated in FIG. 3.

Figure 7:
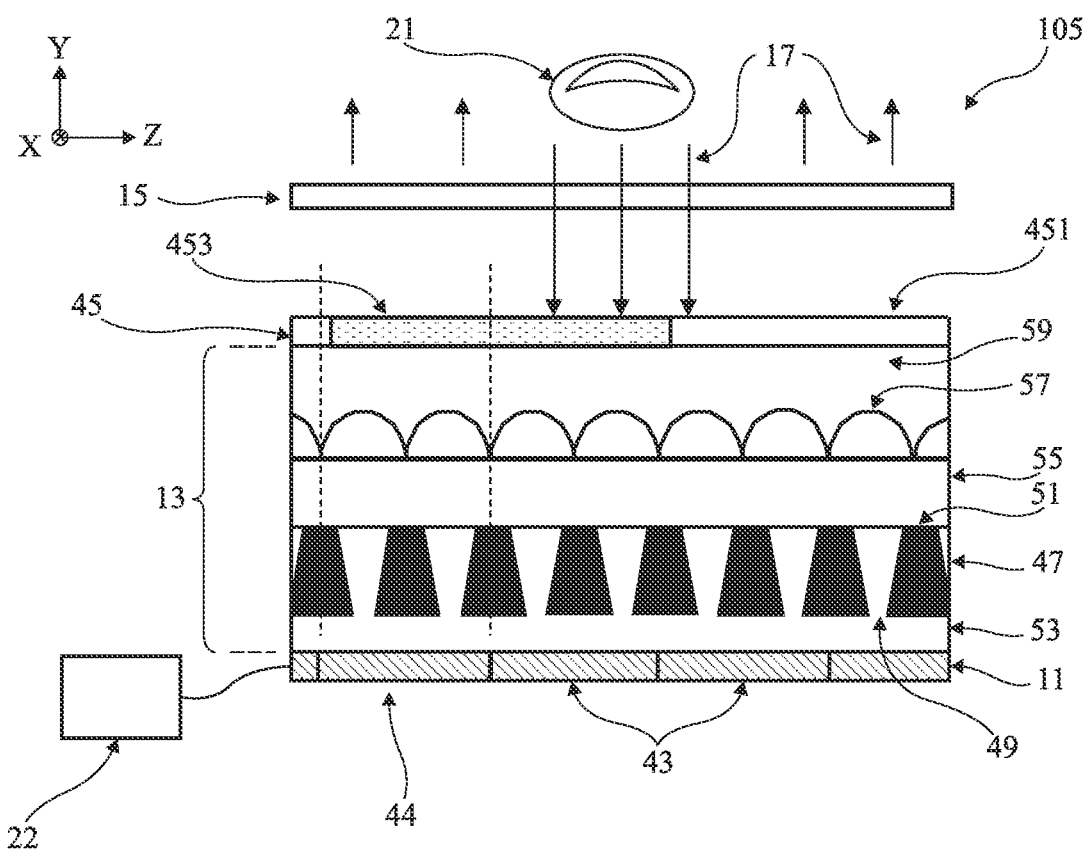
FIG. 7 illustrates, in a partial simplified cross-section view, still another embodiment of an image acquisition device.
Figure 8:
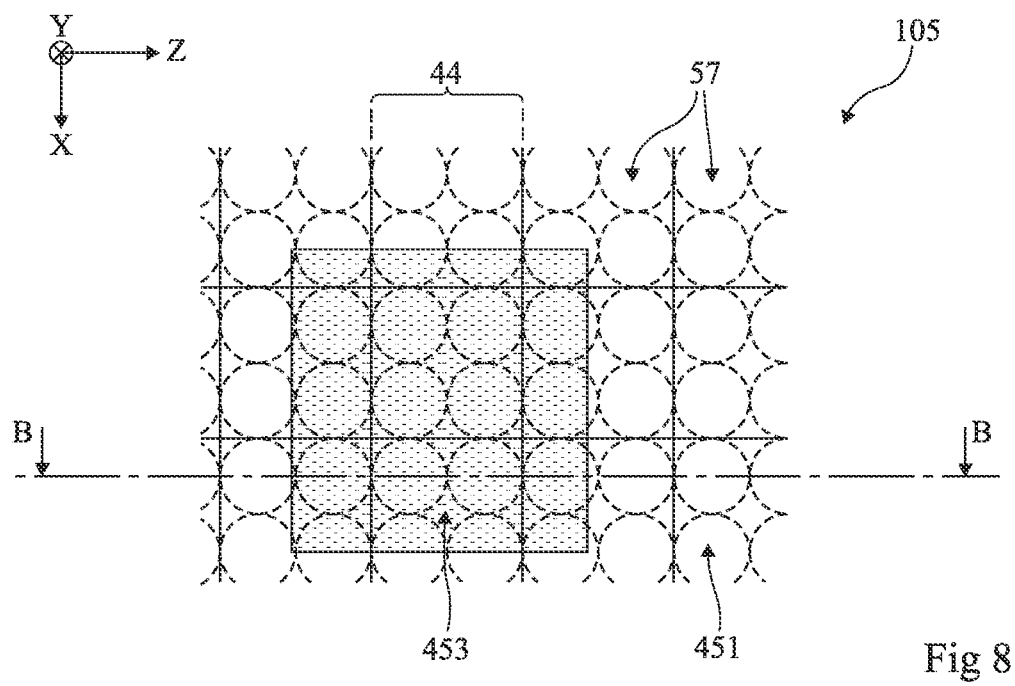
FIG. 8 shows, in a partial simplified top view, an embodiment of the device illustrated in FIG. 7.

FIGS. 7 and 8 illustrate, in a cross-section view and a top view, partial and simplified, still another embodiment of an image acquisition device 105.

More particularly, FIGS. 7 and 8 illustrate a device 105 similar to the device 103 illustrated in FIGS. 3 and 4, with the difference that the second portions 453 of color filter 45 are arbitrarily formed at the surface of optical filter 13 and that they each have a surface area greater (in plane XZ) than the surface area of each second portion 453 of the color filter 45 illustrated in FIGS. 3 and 4.

FIG. 8 is a top view of the device 105 illustrated in FIG. 7, FIG. 7 being a cross-section view along the cross-section plane BB of FIG. 8.

According to the embodiment illustrated in FIGS. 7 and 8, each second portion 453 of color filter 45 is formed on the front surface of optical filter 13 with no previous alignment thereof with photodetectors 43 or the underlying lenses 57.

According to the embodiment illustrated in FIGS. 7 and 8, each first portion 453 of color filter 45 has a substantially square shape in the view of FIG. 8. Preferably, each first portion 453 of filter 45 is formed so that it integrally covers at least one pixel 44 (or a photodetector 43) and this, whatever its location on the upper surface of layer 59. Thus, the surface area of each second portion 453 (in plane XZ) of color filter 45 is at least equal to the surface area of four pixels 44. Preferably, the surface area of each second portion 453 is in the range from the surface area of four pixels 44 to the surface area of six pixels. More preferably, the surface area of each second portion 453 is exactly equal to the surface area of four pixels 44.

According to an embodiment, the repetition pitch of second portions 453 is in the range from a distance corresponding to the dimension of four pixels to a distance corresponding to the dimension of twenty pixels. Preferably, the repetition pitch is substantially equal to a distance corresponding to the dimension of ten pixels. The distribution of the second portions 453 is aligned, that is, the repetition is performed in rows and in columns, or shifted, that is, the distribution is shifted by one or a plurality of pixels from one row to the next one or from one column to the next one.

According to an embodiment, not shown, filter 45 is located between angular filter 13 and image sensor 11, more precisely, between layer 53 and image sensor 11.

Figure 9:
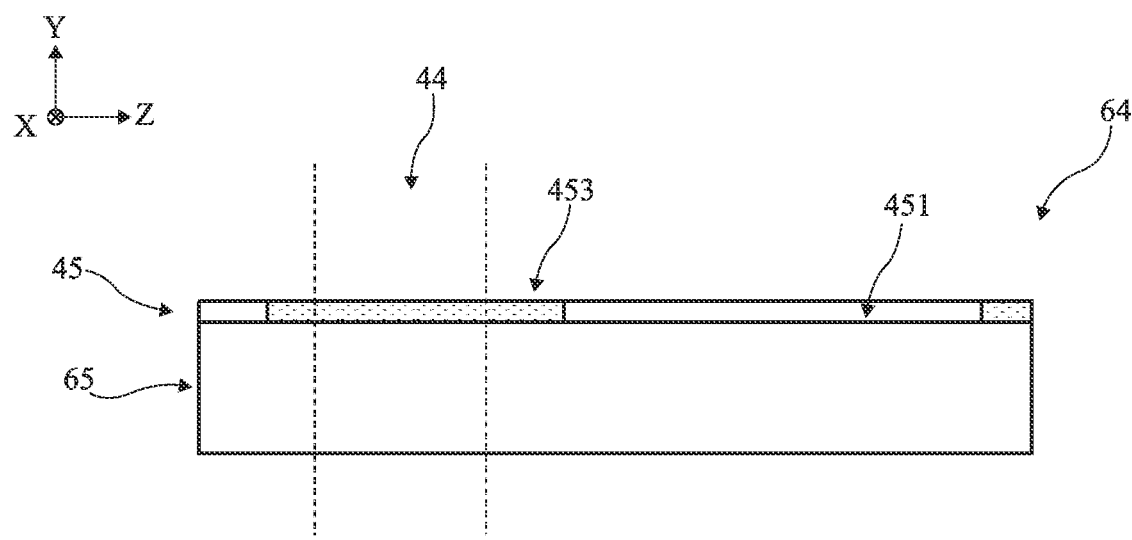
FIG. 9 illustrates, in a partial simplified cross-section view, an embodiment of a structure provided with a color filter.
Figure 10:
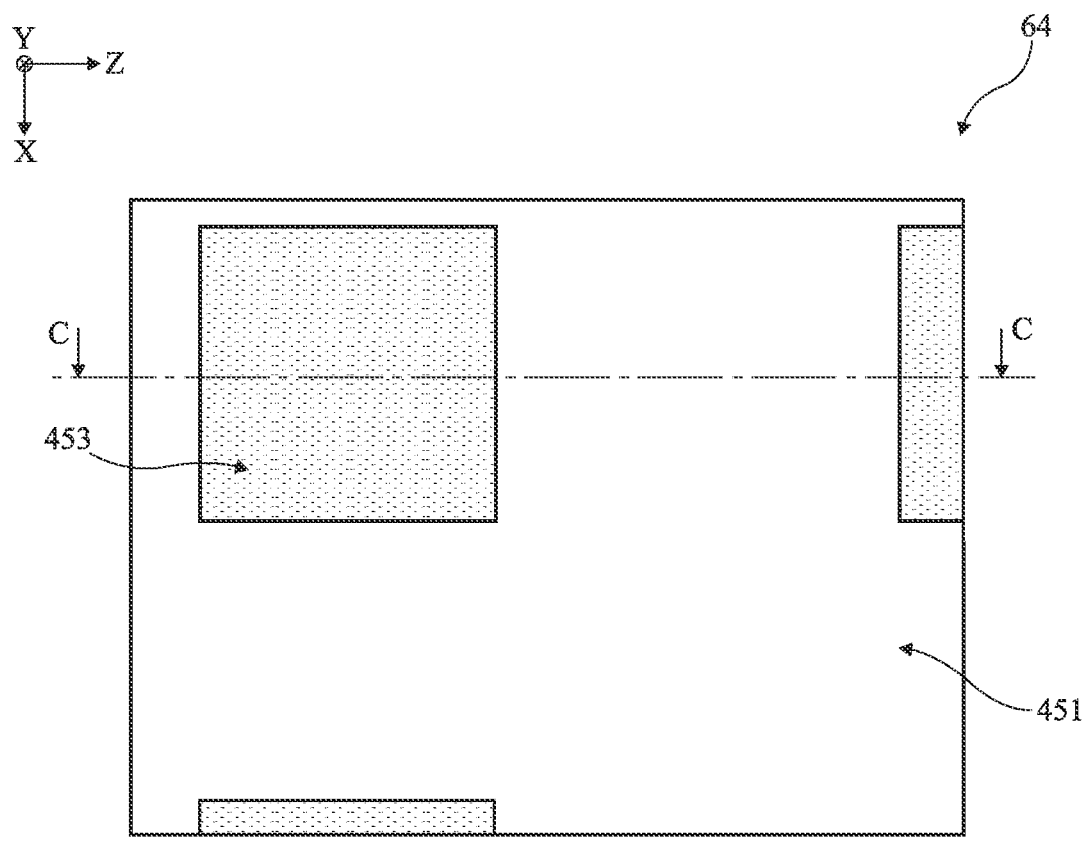
FIG. 10 shows, in a partial simplified top view, an embodiment of the structure illustrated in FIG. 9.

FIGS. 9 and 10 illustrate, in a cross-section view and a top view, partial and simplified, an embodiment of a structure 64 provided with color filter 45.

More particularly, FIG. 9 illustrates an embodiment of a structure 64 comprising color filter 45 and a support 65.

FIG. 10 is a top view of the structure 64 illustrated in FIG. 9, FIG. 9 being a cross-section view along the cross-section plane CC of FIG. 10.

FIG. 10 illustrates the distribution of the second portions 453 in color filter 45.

Preferably, the color filter 45 illustrated in FIGS. 9 and 10 is similar to the color filter 45 illustrated in FIGS. 7 and 8, with the difference that it is formed on the upper surface of support 65 in FIGS. 9 and 10. This advantageously enables to form color filter 45 separately from the other elements of the image acquisition device.

Support 65 may be made of a transparent polymer which does not absorb at least the considered wavelengths, here in the visible and infrared range. This polymer may in particular be made of polyethylene terephthalate (PET), of poly (methyl methacrylate) PMMA, of cyclic olefin polymer (COP), of polyimide (PI), or of polycarbonate (PC). Support 65 is preferably made of PET. The thickness of support 65 may vary from 1 µm to 100 µm, preferably from 10 µm to 50 µm. Support 65 may correspond to a colored filter, to a polarizer, to a half-wave plate or to a quarter-wave plate.

Figure 11:
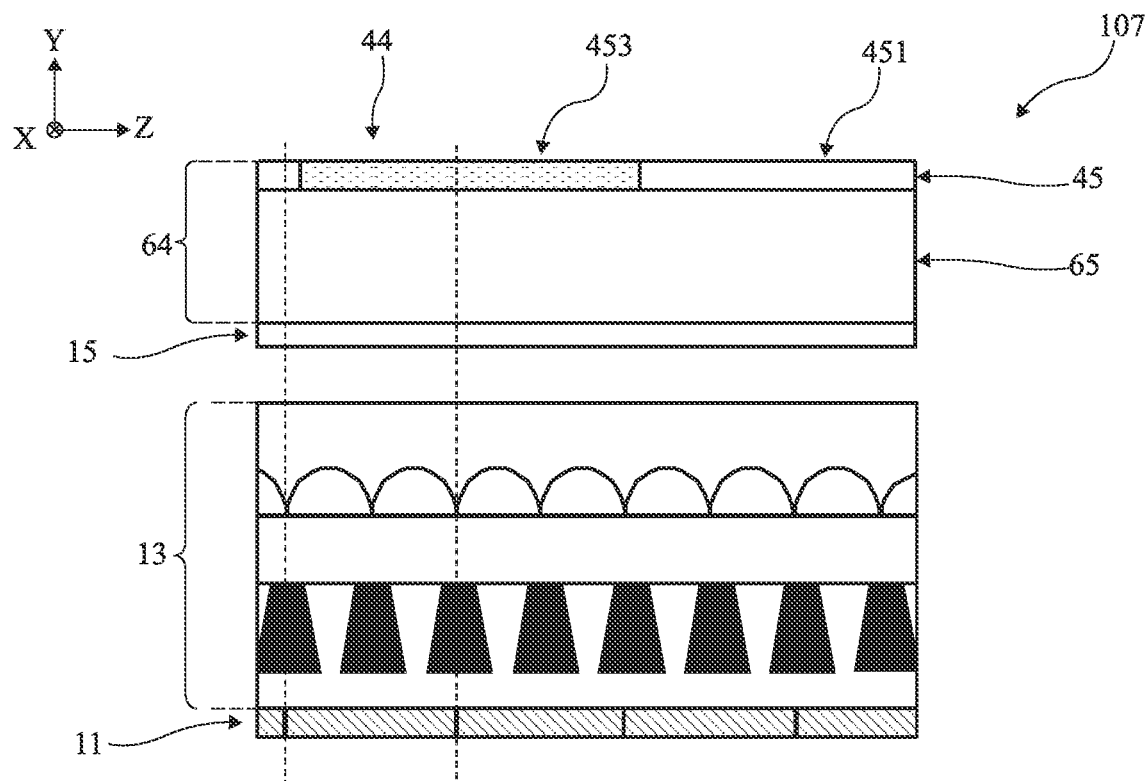
FIG. 11 illustrates, in a partial simplified cross-section view, still another embodiment of an image acquisition device.

FIG. 11 illustrates, in a partial simplified cross-section view, still another embodiment of an image acquisition device.

More particularly, FIG. 11 illustrates a device 107 similar to the device 105, illustrated in FIG. 7, with the difference that it comprises structure 64 instead of color filter 45.

According to the embodiment illustrated in FIG. 11, structure 64 is located on the upper surface of light source 15 so that support 65 covers the upper surface of light source 15 and color filter 45 covers support 65.

According to an implementation mode, structure 64 is transferred onto the upper surface of light source 15 with no alignment of color filter 45 with the lenses 57 of the underlying optical filter 13.

According to an embodiment, not shown, structure 64 is transferred onto the upper surface of light source 15 so that filter 45 covers the upper surface of light source 15 and support 65 covers the upper surface of color filter 45.

According to an embodiment, it may be provided to replace color filter 45 with a hard coating layer associating the functions of color filter and of protection of light source 15.

Figure 12:
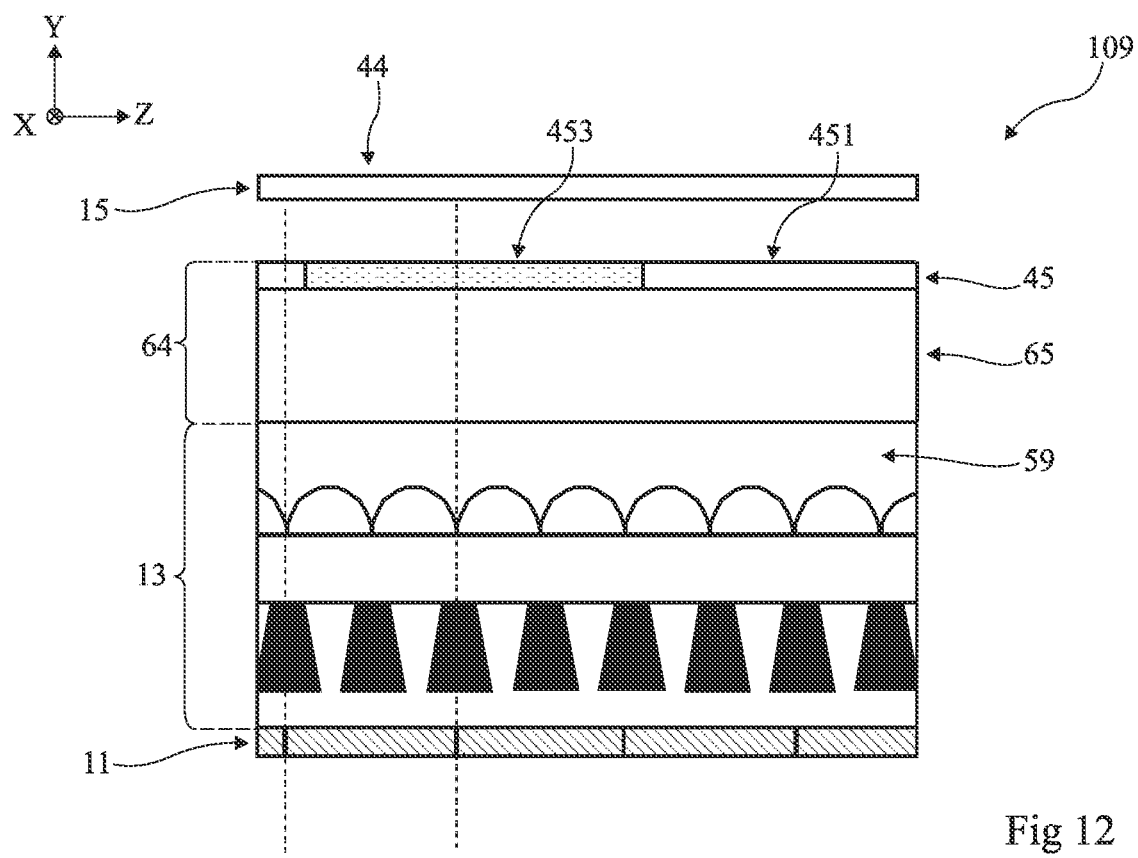
FIG. 12 illustrates, in a partial simplified cross-section view, still another embodiment of an image acquisition device.

FIG. 12 illustrates, in a partial simplified cross-section view, still another embodiment of an image acquisition device.

More particularly, FIG. 12 illustrates a device 109 similar to the device 107 illustrated in FIG. 11, with the difference that structure 64 is located between light source 15 and optical filter 13.

According to an embodiment, not shown, structure 64 is transferred onto the upper surface of layer 59 so that filter 45 covers the upper surface of layer 59 and support 65 covers the upper surface of color filter 45.

Figure 13:
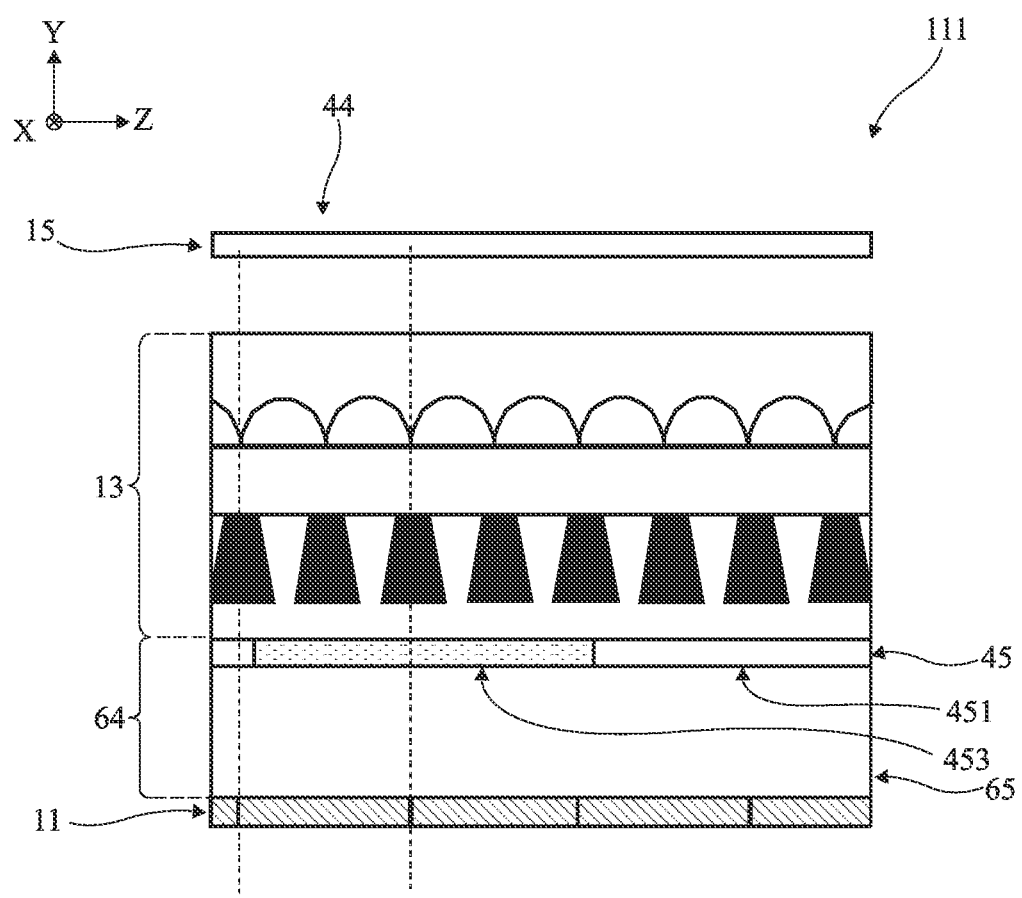
FIG. 13 illustrates, in a partial simplified cross-section view, still another embodiment of an image acquisition device.

FIG. 13 illustrates, in a partial simplified cross-section view, still another embodiment of an image acquisition device.

More particularly, FIG. 13 illustrates a device 111 similar to the device 107 illustrated in FIG. 11, with the difference that structure 64 is located between sensor 11 and optical filter 13.

According to an embodiment, not shown, structure 64 is transferred onto the upper surface of sensor 11 so that filter 45 covers the upper surface of sensor 11 and support 65 covers the upper surface of color filter 45.

Figure 14:
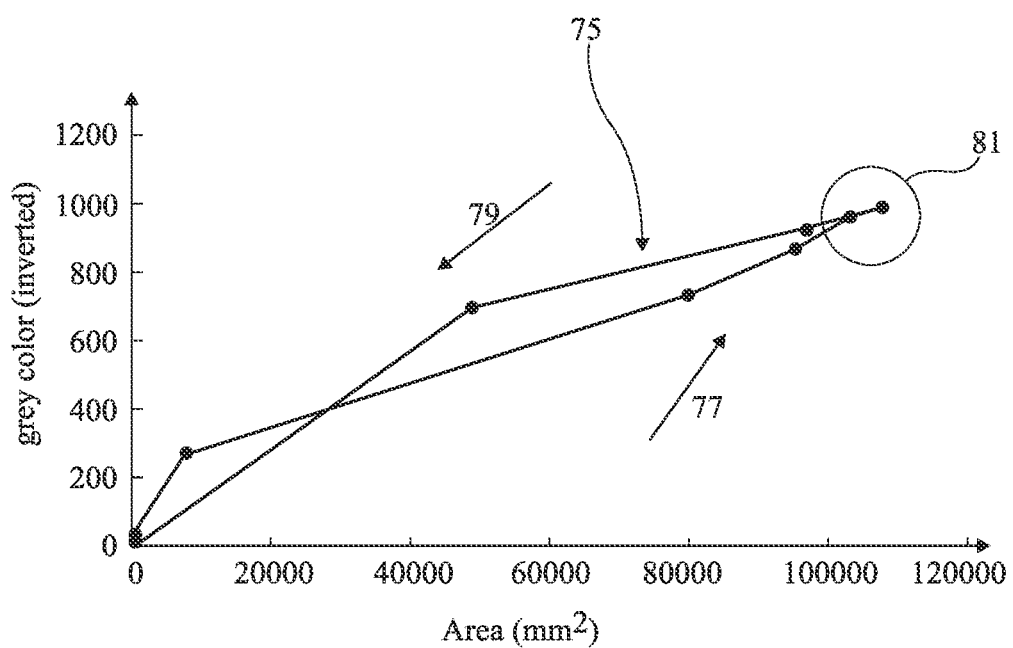
FIG. 14 is a representation of an example of variation of the area of a real finger illuminated by a radiation.

FIG. 14 is a representation of an example of variation of the area of a real finger illuminated by a radiation.

More particularly, FIG. 14 illustrates, based on a finger imaged by photodetectors 43 within device 103, 104, 105, 107, 109, or 111, the variation of the area of the finger in contact with the surface of said image acquisition device during a pressure 77 of the finger on the device, and then during a pressure release 79.

In FIG. 14, curve 75 comprises a series of measurements (points), each extracted from a different image, corresponding to the variation of the grey level area of the center of the finger according to said grey level.

In other words, during a pressure motion of the finger onto the device, and then a release, the device acquires a plurality of images. For each of the images, the grey level (grey color (inverted)) of the center of the finger is extracted and the surface area (Area (mm$^2$)) of the image, in square millimeters, having this grey level, or a close grey level (that is, having a luminosity difference in the order of a few percents) is determined. The measurements on a plurality of images are gathered in curve 75.

Curve 75 comprises a hysteresis 81, between pressure 77 and release 79. This hysteresis 81 is due to the blood inflow into the finger during release 79.

The hysteresis 81 of curve 75 being characteristic of a blood inflow, it is characteristic of a real finger. It is thus possible to distinguish a case of fraud (fake finger: for example silicone or 2D finger) by extracting the surface and the grey level described hereabove.

An advantage of the embodiments and of the implementation modes described in FIGS. 3 to 13 is that they enable to detect the use of fake fingers in two dimensions or three dimensions with the acquisition of a single image.

Another advantage of the embodiments and of the implementation modes described in FIGS. 3 to 13 is that they enable to detect the use of a fake finger in two dimensions within less than 200 milliseconds.

Still another advantage of the embodiments and of the implementation modes described in FIGS. 3 to 13 is that they use a single sensor, which enables to decrease the thickness of telephones. Indeed, a telephone provided with two sensors, one of which is adapted to capturing the visible radiation and the other one of which is adapted to capturing the infrared radiation, will be thicker than a telephone provided with a single sensor adapted to capturing the visible and infrared radiation.

Still another advantage of the embodiments and of the implementation modes described in FIGS. 7 to 11 is that they enable to do away with the alignment of the second portions 453 of color filter 45 with photodetectors 43. The surface area of the second portions 453 of color filter 45 is indeed selected so that each second portion 453 of color filter 45 fully covers at least one photodetector 43.

Various embodiments and variants have been described. Those skilled in the art will understand that certain features of these various embodiments and variants may be combined, and other variants will occur to those skilled in the art. In particular, the embodiments and the examples described in relation with FIGS. 5 and 6 may be combined with the embodiments illustrated in FIGS. 7 to 13 and some of the embodiments described in relation with FIG. 11 may be combined with the embodiments described in relation with FIGS. 12 and 13.

Further, the described embodiments are for example not limited to the examples of dimensions and of materials mentioned hereabove.

Finally, the practical implementation of the described embodiments and variations is within the abilities of those skilled in the art based on the functional indications given hereabove.

The invention claimed is:

1. A method for detecting a real or fake finger by an image acquisition device, comprising the steps of:
    a) acquiring an image of the finger at a given wavelength;
    b) determining a response signal from said image; and
    c) comparing the determined response signal with a reference value according to a comparison criterion and determining that the finger is a fake finger if the comparison criterion is not respected,
    wherein steps a), b), and c) are repeated for at least two different wavelengths,
    wherein the comparison criterion comprises determining whether the determined response signal corresponds to the reference value, to within a threshold, the threshold corresponding to a difference between the reference value and a grey level value at half-maximum of a reference distribution.

2. The method according to claim 1, wherein step b) comprises determining a grey level distribution of the acquired image, the response signal being equal to the central grey level of the distribution.

3. The method according to claim 1, wherein steps a), b), and c) are repeated for at least three different wavelengths.

4. An image acquisition device configured for implementing the method of claim 1, the device comprising: a single sensor comprising organic photodetectors, an angular filter, and a color filter, different from the angular filter, the color filter comprising:
- one or a plurality of first portions adapted to giving way to at least one wavelength in a visible range, and
- one or a plurality of second portions filtering wavelengths outside of red and/or near infrared, each second portion having a surface area approximately equal to a surface area of one of the photodetectors or a surface area greater than or equal to a surface area of four of the photodetectors.

5. The device according to claim 4, wherein:
the first portions of the color filter are adapted to giving way to at least one wavelength in a band from 400 nm to 600 nm, and/or
the second portions of the color filter filter wavelengths outside of a band from 600 nm to 1,100 nm.

6. The device according to claim 4, wherein:
some of the first portions of the color filter are adapted to only giving way to wavelengths in a band from 460 nm to 600 nm, and some of the first portions are adapted to only giving way to wavelengths in a band from 500 nm to 580 nm; and/or
some of the second portions of the color filter are adapted to filtering wavelengths outside of a band from 600 nm to 700 nm, and some of the second portions are adapted to filtering wavelengths outside of a band from 700 nm to 1,100 nm.

7. The device according to claim 4, wherein:
all first portions and second portions of the color filter are adapted to giving way at least to wavelengths in a band from 700 nm to 1,100 nm;
some of the first portions or second portions of the color filter are adapted to in addition only giving way to wavelengths in a band from 400 nm to 500 nm;
some of the first portions or second portions of the color filter are adapted to in addition only giving way to wavelengths in a band from 500 nm to 600 nm;
some of the first portions or second portions of the color filter are adapted to in addition only giving way to wavelengths in a band from 600 nm to 700 nm;
some of the first portions or second portions of the color filter are adapted to filtering wavelengths outside a band from 700 nm to 1,100 nm.

8. The device according to claim 4, wherein each photodetector delimits a pixel, each pixel having a substantially square base, and wherein one side of each pixel has a length of 50 μm.

9. The device according to claim 4, wherein each second portion has a surface area in a range from a surface area of four of the photodetectors to a surface area of six of the photodetectors, or wherein a surface area of each second portion being approximately equal to a surface area of four of the photodetectors.

10. The device according to claim 4, further comprising a light source adapted to emitting:
- at least one wavelength between 400 nm and 600 nm, or between 460 nm and 600 nm; and
- at least one wavelength between 600 nm and 1,100 nm, or between 680 nm and 940 nm.

11. The device according to claim 10, comprising, from bottom to top:
- the image sensor;
- the angular filter;
- the light source; and
- the color filter.

12. The device according to claim 10, comprising, from bottom to top:
- the image sensor;
- the angular filter;
- the color filter; and
- the light source.

13. The device according to claim 10, comprising, from bottom to top:
- the image sensor;
- the color filter;
- the angular filter; and
- the light source.

14. The device according to claim 4, further comprising a support in contact with the color filter, the support being made of a polymer that is clear in a visible range and in infrared.

* * * * *